UNITED STATES PATENT OFFICE.

ADOLPH RÖMER, OF LUDWIGSHAFEN-ON-THE-RHINE, BAVARIA, ASSIGNOR TO THE BADISCHE ANILIN AND SODA FABRIK, OF MANNHEIM, GERMANY.

MANUFACTURE OF RED COLORING-MATTER.

SPECIFICATION forming part of Letters Patent No. 359,576, dated March 15, 1887.

Application filed January 18, 1887. Serial No. 224,720. (No specimens.)

*To all whom it may concern:*

Be it known that I, ADOLPH RÖMER, doctor of philosophy, a subject of the King of Würtemberg, residing at Ludwigshafen-on-the-Rhine, in the Kingdom of Bavaria and Empire of Germany, have invented new and useful Improvements in the Manufacture of a Red Coloring-Matter or Dye-Stuff from Alpha-Naphthylene-Diamine, of which the following is a specification.

This invention relates to a red coloring-matter or dye-stuff from alpha-naphthylene-diamine, (the known reduction compound of the alpha-dinitro-naphthalene, fusing at 216° centigrade,) and is produced by first converting the said alpha-naphthalene-diamine into its tetrazo compound and by afterward combining one molecule of the said tetrazo compound with two molecules of naphthionic acid.

To carry out my invention I proceed as follows: About twenty-three (23) parts, by weight, of the hydrochlorate of the before-named alpha-naphthalene-diamine, in a state of fine division, about one hundred and twenty-five (125) parts, by weight, of hydrochloric acid containing about thirty-five (35) per cent. of the dry acid, (HCl,) about two hundred and fifty (250) parts, by weight, of water, and an equal quantity of ice, are intimately mixed, and then about fourteen (14) parts, by weight, of nitrite of sodium, previously dissolved in three times their weight of water, are gradually added.

By the employment of the very large excess of hydrochloric acid above described the conversion of the diamine into its hitherto unknown tetrazo compound—a conversion which as yet has been unsuccessfully attempted by chemists (Berichte Deutsche Chem. Ges., Vol. VII, page 306–319)—proceeds without any appreciable formation of by-products. The solution of the tetrazo compound thus obtained is then added to a solution obtained by dissolving about seventy parts, by weight, of naphthionate of sodium (prepared from alpha-naphthylamine) and about two hundred parts, by weight, of crystallized acetate of soda in about three thousand (3,000) parts, by weight, of water. Immediately after the said ingredients are mixed a red precipitate begins to form.

The mixture is to be kept well agitated during several days, until by the application of the following tests the end of the reaction will be indicated: From time to time a sample of the mixture is withdrawn, rendered strongly alkaline by the addition of a carbonate of soda and heated to ebullition. The operation will then have to be considered at an end when no longer any evolution of nitrogen can be observed. Another sample of the mixture may be tested from time to time by dyeing therein some cotton. It will then be noticed that the clearness and purity of the color gradually increases until the reaction is thoroughly completed. The formation of the coloring-matter being thus finished, the mixture is rendered strongly alkaline by the addition of carbonate of soda heated to ebullition and then allowed to get cool. The coloring-matter thus obtained in a crystalline condition is then separated from the mother-liquor, pressed, and dried.

The coloring-matter or dye-stuff prepared as hereinbefore described belongs to the class of the so-called "azo-dyes," and is chiefly remarkable on account of its property to dye a full and bright red upon vegetable fiber without the aid of a mordant—a property which it shares with certain already known azo-dyes, derivations of benzidine and tolidine bearing the commercial names of "Congo red" and "benzo-purpurine." From the said azo-dyes my coloring-matter may be distinguished by the following characteristics: If a solution of one part, by weight, of my coloring-matter in one thousand parts of water prepared at 15° centigrade is mixed with its equal volume of strong spirits of salt, (containing about thirty per cent. of dry hydrochloric acid,) immediately a dirty-colored yellowish-green precipitate is produced. Under the same conditions acidified solutions of the above-named Congo red and benzo-purpurine instantaneously produce bright-colored precipitates, the former of a pure blue, the latter of a greenish blue. The same characteristic changes of color may be observed by putting a drop of strong spirits of salt upon cotton fabrics dyed with the before-mentioned coloring-matters. Other characteristic differences are exhibited by boiling aqueous solutions of my coloring-matter and of Congo red and benzo-purpurine, respectively, with zinc-dust until decolorization ensues. The colorless solutions thus obtained are quickly filtered, while hot, and shaken, after cooling, with sulphide of carbon, in order to extract therefrom the original diamine thus regenerated. The layer of sulphide of carbon is then separated from the supernatant aqueous solution and shaken up with gradually-increasing quantities of a very dilute solution of bromine in water. While in the case of Congo red and benzo-purpurine an intense blue coloration, indicative of benzidine and tolidine, is developed, my coloring-matter produces only a pale dingy reddish color.

What I claim as new, and desire to secure by Letters Patent, is—

As a new product, the red coloring-matter or dye-stuff from alpha-naphthylene-diamine, hereinbefore described, and having the property of dyeing a full and bright red upon vegetable fiber without the aid of a mordant, and to form, with strong spirits of salt, a dirty-colored yellow-greenish precipitate, substantially as set forth.

In testimony whereof I have hereunto set my hand in the presence of two subscribing witnesses.

ADOLPH RÖMER.

Witnesses:
HEINRICH CARO,
JOHANNES BÜTTNER.